United States Patent
Park et al.

(10) Patent No.: US 11,584,251 B2
(45) Date of Patent: Feb. 21, 2023

(54) METHOD FOR DISPLAYING CHARGE ENERGY BY SOLAR ROOF SYSTEM OF VEHICLE

(71) Applicants: Hyundai Motor Company, Seoul (KR); Kia Motors Corporation, Seoul (KR)

(72) Inventors: Jung-Soo Park, Incheon (KR); Seung-Wan Son, Gyeonggi-do (KR); Kyu-Jin Lee, Seoul (KR); Dong-Jun Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 550 days.

(21) Appl. No.: 16/665,184

(22) Filed: Oct. 28, 2019

(65) Prior Publication Data

US 2020/0247258 A1    Aug. 6, 2020

(30) Foreign Application Priority Data

Jan. 31, 2019    (KR) .......................... 10-2019-0012518

(51) Int. Cl.
| | |
|---|---|
| *B60L 53/51* | (2019.01) |
| *H02S 10/40* | (2014.01) |
| *B60L 53/20* | (2019.01) |
| *B60L 53/60* | (2019.01) |
| *B60L 50/60* | (2019.01) |

(52) U.S. Cl.
CPC .............. *B60L 53/60* (2019.02); *B60L 50/60* (2019.02); *B60L 53/20* (2019.02); *B60L 53/51* (2019.02); *H02S 10/40* (2014.12); *B60L 2210/10* (2013.01)

(58) Field of Classification Search
CPC ...... B60L 2210/10; B60L 50/60; B60L 53/51; B60L 53/20; B60L 53/60; H02S 10/40
USPC ................................ 307/10.1, 10.6; 701/22
See application file for complete search history.

(56) References Cited

U.S. PATENT DOCUMENTS

| | | | | |
|---|---|---|---|---|
| 10,554,057 | B1 * | 2/2020 | Wang ..................... | H02J 7/1423 |
| 2012/0136534 | A1 * | 5/2012 | Walsh ................. | H01M 10/465 |
| | | | | 701/36 |

FOREIGN PATENT DOCUMENTS

KR    20160146347 A    12/2016

* cited by examiner

*Primary Examiner* — Michael R. Fin
(74) *Attorney, Agent, or Firm* — Fox Rothschild LLP

(57) ABSTRACT

A method for displaying charge and gain energy by a vehicle solar roof system is provided. The method includes determining whether the vehicle is in a parking or driving mode based on whether the vehicle key is turned on or off when the solar roof system installed in the vehicle operates. A corresponding consumed energy is calculated by determining whether the solar roof system charges the auxiliary battery or the main battery. The consumed energy is displayed in the cluster of the vehicle and booting is performed when the key is turned on in the parking mode and displayed when the key is turned off in the driving mode. The consumed energy is calculated based on efficiency of a charge amount of the auxiliary battery or the main battery and a gain fuel amount is changed based on the charge amount and calculated due to the saved energy.

12 Claims, 2 Drawing Sheets

METHOD FOR DISPLAYING CHARGE ENERGY BY SOLAR ROOF SYSTEM OF VEHICLE

CROSS-REFERENCE TO RELATED APPLICATIONS

This application claims priority under 35 U.S.C. § 119 to Korean Patent Application No. 10-2019-0012518, filed on Jan. 31, 2019, the disclosure of which is incorporated herein by reference in its entirety.

BACKGROUND OF THE INVENTION

1. Field of the Invention

The present invention relates to a method for displaying a charge energy by a solar roof system of a vehicle, and more particularly, to a method for displaying a gain energy charged by a solar roof system to a driver.

2. Description of the Related Art

Generally, a separate solar collecting plate is provided on a roof of a passenger vehicle or a top roof of a lorry, and a capacitor and an inverter are self-installed and used in an interior of a vehicle. However, since the solar colleting plate, the capacitor, and the inverter are easily self-installed there is a risk of accidents due to the solar collecting plate falling due to a high speed operation or impact of an automobile. In the related art, a roof carrier that is installed and used on the roof of the vehicle generally has only a locker function to store luggage.

A solar roof as a system that charges a high voltage battery and a low voltage battery of environment vehicles using external sunlight may be charged both when the vehicle is being operated and when the vehicle is parked/stopped, thereby improving fuel efficiency. The state of charge (SOC) control is a control that improves the fuel efficiency by charging/discharging a battery based on an efficiency point of an engine using the high voltage battery of an environment vehicle and turning the engine on/off based on a SOC of the battery.

In this regard, there has been no technology for obtaining solar energy and displaying information related to the solar energy in the vehicle in the related art. However, as similar technology, a developed technology provides a roof carrier that includes a solar energy generation system and provides a general solar energy generation system in which a solar collecting plate and a waterproof outlet for external emergency power are provided on a cover roof surface of a roof carrier and a capacitor, an inverter, and a switchboard are united in a locker of the roof carrier and a switch box for expanding a power storage quantity are configured to emergently charge an automobile battery and a mobile phone battery outside the roof carrier without starting an automobile. However, in the related art information may not be transferred to a driver with respect to an external energy gain amount such as a solar energy.

SUMMARY

The present invention provides a method for mounting a solar energy on a vehicle and displaying the resulting obtained energy gain amount to a driver.

An exemplary embodiment of the present invention provides a method for displaying a charge energy by a solar roof system of a vehicle that may include: determining whether the vehicle is in a parking mode or a driving mode based on whether a key of the vehicle is turned on or off when the solar roof system charging an auxiliary battery and a main battery installed in the vehicle operates; calculating a corresponding consumed energy by determining whether the solar roof system charges the auxiliary battery or the main battery; displaying the consumed energy in the cluster of the vehicle and performing booting when the key is turned on in the parking mode and displaying the consumed energy in the cluster when the key is turned off in the driving mode.

The consumed energy may be calculated according to efficiency of a charge amount of the auxiliary battery or the main battery and a gain fuel amount may be changed based on the charge amount and calculated due to the saved energy. For example, the gain fuel amount may be calculated as $$\text{fuel}_{solar} = \left( \frac{C_1 - C_{Controller}}{\eta_{MainDch} \cdot \eta_{LDC} \cdot \eta_{AuxChg}} + \epsilon_2 \cdot \frac{1}{D_e} \right)$$

and the consumed energy may be calculated as $$C_1 = C_{solar} * \eta_{LSDC} * \eta_{AuxChg}$$

in the case of the auxiliary battery, and the consumed energy may be calculated as $\epsilon_2 = \epsilon_{solar} * \eta_{HSDC} * \eta_{MainChg}$ in the case of the main battery.

When the auxiliary battery is charged by a low DC-DC converter (LDC), the auxiliary battery may be charged with an energy by the solar roof system through a low solar DC-DC converter (SDC). When the main battery is charged by a low DC-DC converter (LDC), the main battery may be charged with an energy by the solar roof system through a high solar DC-DC converter.

Additionally, the auxiliary battery may be recharged with the energy charged through the high solar DC-DC converter (SDC) through the low DC-DC converter (LDC). The charge energy by the solar roof system may be displayed in the cluster or an audio video navigation (AVN), and at least any one of a solar charging amount, fuel efficiency, a gain charge energy, or a gain fuel amount according to the parking mode and the driving mode may be displayed.

According to an exemplary embodiment of the present invention, an external energy may be used for driving a vehicle by generating power by a solar roof system by mounting a solar roof. Additionally, charging is not performed using fuel through an internal combustion engine, but fuel efficiency may be enhanced by using an external energy which is not related to a vehicle, thereby increasing a high-tech image.

BRIEF DESCRIPTION OF THE DRAWINGS

A brief description of each drawing is provided to more sufficiently understand drawings used in the detailed description of the present invention.

DETAILED DESCRIPTION

Figure 1A:
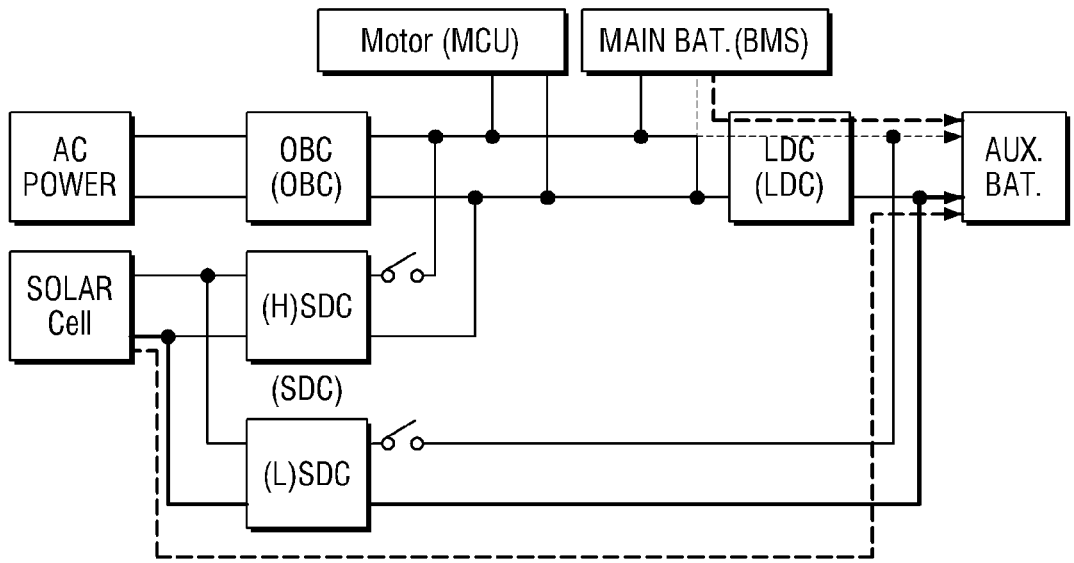
FIG. 1A illustrates a path in which the auxiliary battery is charged through LSDC according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to contents disclosed in the accompanying drawings. However, the present invention is not restricted or limited by exemplary embodiments. Like reference numerals presented in each drawing refer to elements that perform substantially the same functions.

Objects and effects of the present invention may be naturally appreciated or clearer by the following description and the objects and effects of the present invention are not limited only by the following disclosure. Further, in describing the present invention, a detailed description of known technologies associated with the present invention may be omitted when it is determined to unnecessarily obscure the subject matter of the present invention.

Figure 1B:
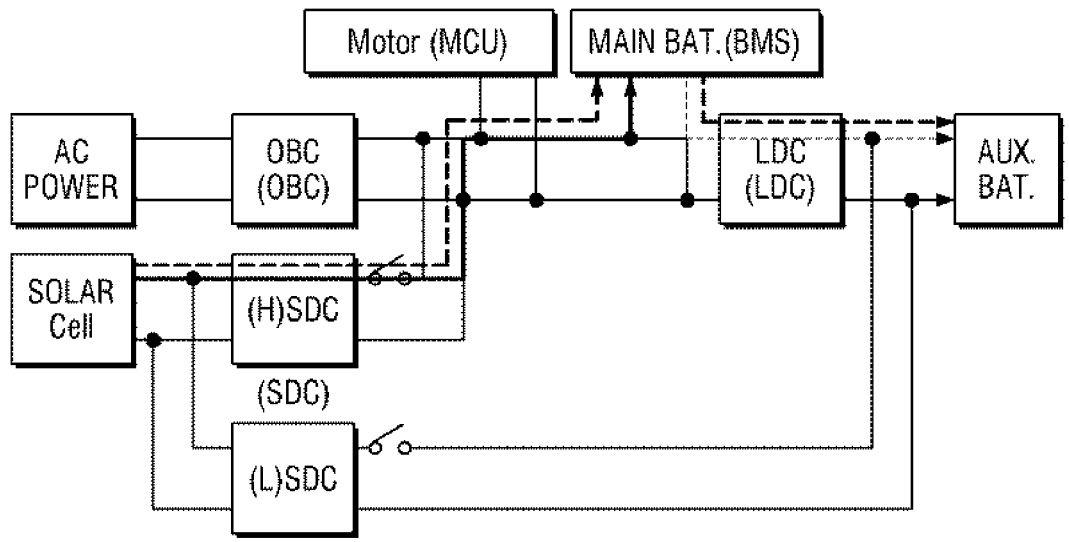
FIG. 1B illustrates a path in which the main battery is charged through HSDC according to an exemplary embodiment of the present invention.

FIGS. 1A and 1B illustrate a path in which a main battery and an auxiliary battery are charged according to an exemplary embodiment of the present invention. In particular, FIG. 1A illustrates a path in which the auxiliary battery is charged through LSDC and FIG. 1B illustrates a path in which the main battery is charged through HSDC. Referring to FIG. 1A, the solar energy may charge the auxiliary battery and the main battery may also charge the auxiliary battery. Referring to FIG. 1B, the main battery charging the auxiliary battery may be directly charged even with the solar energy.

When the auxiliary battery is charged by a low DC-DC converter (LDC), the auxiliary battery may be charged with an energy by the solar roof system through a low solar DC-DC converter (SDC) and when the main battery is charged by the low DC-DC converter (LDC), the main battery may be charged with the energy by the solar roof system through a high solar DC-DC converter (SDC). Particularly, in respect to fuel efficiency, after it is assumed that as much as an energy charged by the auxiliary battery by the solar energy, the energy charged in the auxiliary battery through the LDC in the main battery is saved, a gain energy may be calculated.

The auxiliary battery may be recharged with an energy charged through a high Solar DC-DC Converter (SDC) using a low DC-DC converter (LDC). For a gain energy, for a parked vehicle, information regarding a total energy charged during parking may be displayed to a cluster within the vehicle when a key is turned on or when vehicle is being driven, information regarding a total energy charged during driving may be displayed in the cluster when the key is turned off. In other words, when the vehicle is parked and then turned on, the display may indicate a total energy that was charged while the vehicle was park. Additionally, after the vehicle has stopped and is turned off, a total energy charged while the vehicle was being driven may be displayed. Further, a display unit may be variously displayed as a gain fuel amount (liter), a gain drivable distance (Km), the gain energy (kWh), and the like.

Figure 2:
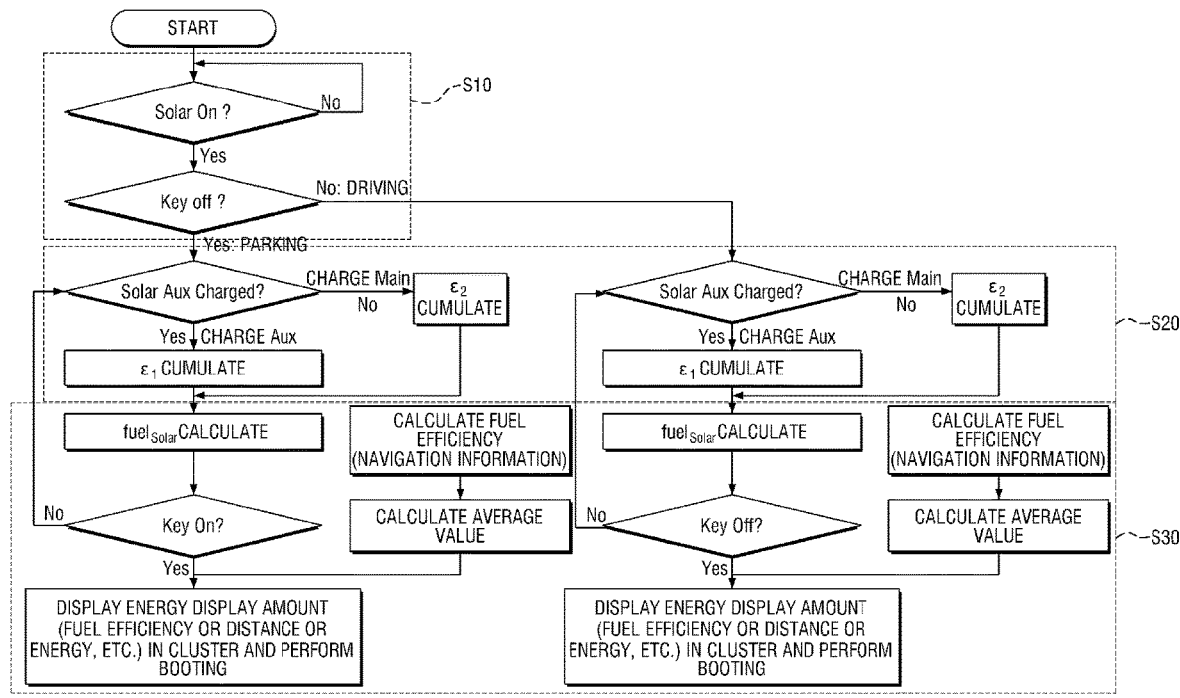
FIG. 2 illustrates a flowchart of a method for displaying a charge energy by a solar roof system of a vehicle according to an exemplary embodiment of the present invention.

FIG. 2 illustrates a flowchart of a method for displaying a charge energy by a solar roof system of a vehicle according to an exemplary embodiment of the present invention. The method described herein may be executed by a controller having a processor and a memory. Particularly, referring to FIG. 2, the present invention may include determining whether a vehicle is in a parking mode or a driving mode (S10); calculating a consumed energy (S20); and displaying the consumed energy in a cluster (S30). In the determining of whether the vehicle is in the parking mode or the driving mode (S10), when a solar roof system charging an auxiliary battery and a main battery installed in the vehicle operates, the controller may be configured to determine the mode based on whether a key of the vehicle is turned on or off.

In a fuel efficiency display method, after it is assumed that as much as an energy charged by the auxiliary battery by the solar roof system, the energy charged in the auxiliary battery through the LDC in the main battery is saved, a process of calculating the gain energy may be applied. For the gain energy, when a vehicle is parked, information regarding a total energy charged during parking may be displayed to a cluster when a key is turned on and for a driving vehicle, information regarding a total energy charged during driving may be displayed in the cluster when the key is turned off. The calculating of the consumed energy of the corresponding battery (S20) may include determining whether the solar roof system charges the auxiliary battery or the main battery.

The consumed energy may be calculated based on efficiency of a charge amount of the auxiliary battery or the main battery and a gain fuel amount may be changed based on the charge amount and calculated due to the saved energy.

The gain fuel amount may be calculated as $$\text{fuel}_{solar} = \left( \frac{\epsilon_1 - \epsilon_{Controller}}{\eta_{MainDch} \cdot \eta_{LDC} \cdot \eta_{AuxChg}} + \epsilon_2 \cdot \frac{1}{D_e} \right)$$

and the consumed energy may be calculated as $\epsilon_1 = \epsilon_{solar} * \eta_{LSDC} * \eta_{AuxChg}$ for the auxiliary battery.

Further, the consumed energy may be calculated as $\epsilon_2 = \epsilon_{solar} * \eta_{HSDC} * \eta_{MainChg}$ for the main battery.

wherein $\text{fuel}_{solar}$: gain fuel amount (1), $D_e$: energy density (kJ/l), $\epsilon_{controller}$: consumed energy (kJ) of controller, $\epsilon_{solar}$: charged energy (kJ), and η: efficiency (LSDC, HSDC: SDC high low efficiency, AuxChg: auxiliary battery charging efficiency, MainChg: high-voltage battery charging efficiency, MainDch: high-voltage battery discharging efficiency, and LDC: LDC efficiency).

According to an exemplary embodiment of the present invention, the display unit may be variously displayed as the gain fuel amount (liter), the gain drivable distance (Km), the gain energy (kWh), and the like and may include all displayable contents. When the auxiliary battery is charged with the solar energy, $\epsilon_1$ may be calculated and when the main battery is charged with the solar energy, $\epsilon_2$ may be calculated. In each case, $\epsilon_1$ or $\epsilon_2$ may be calculated as shown in the above equation to calculate a gain fuel amount ($\text{fuel}_{solar}$).

Additionally, the displaying of the consumed energy in the cluster (S30) may include displaying the consumed energy in the cluster of the vehicle and performing booting when the key is turned on in the parking mode and displaying the consumed energy in the cluster when the key is turned off in the driving mode.

Figure 3:
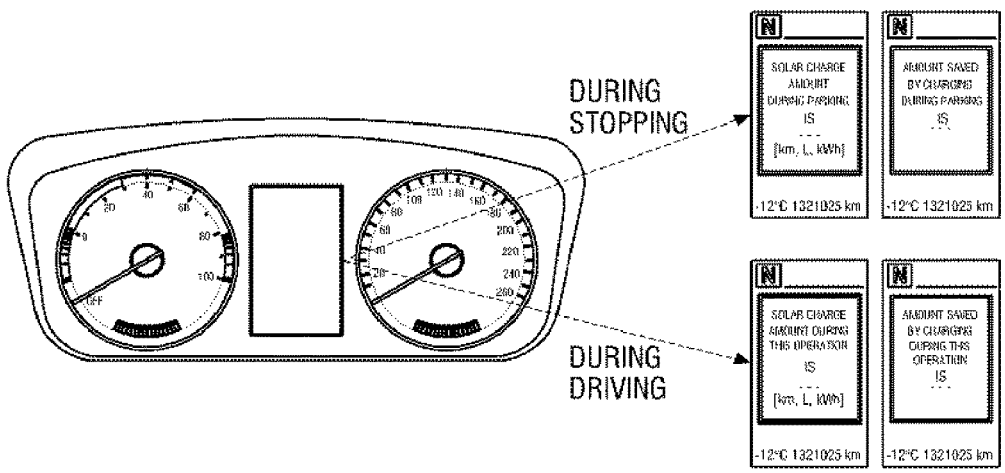
FIG. 3 illustrates a state in which transfer information is displayed in a cluster of a vehicle according to an exemplary embodiment of the present invention.

FIG. 3 illustrates a state in which transfer information is displayed in a cluster of a vehicle according to an exemplary embodiment of the present invention. Referring to FIG. 3, the charge amount during parking or the solar energy charged during an operation is shown in the cluster. The charge energy by the solar roof system may be displayed in the cluster or an audio video navigation (AVN) and according to an exemplary embodiment of the present invention. When the charge energy is displayed in the cluster, at least any one of a solar charging amount, a fuel efficiency, a gain charge energy, or a gain fuel amount according to the parking mode and the driving mode may be displayed.

In respect to contents displayed in the cluster, a fuel gain amount ($\text{fuel}_{solar}$) and an additional drivable distance may be expressed as existing average fuel efficiency (km/l)×fuel gain amount ($\text{fuel}_{solar}$), the gain energy may be expressed as $\text{fuel}_{solar} \times D_e$ (kWh), and gain maintenance cost may be calculated as gain fuel amount×average fuel cost (calculated by referring to navigation information). When the contents are displayed in the AVN, cumulative history display is also possible.

Although the present invention has been described in detail through the representative exemplary embodiment hereinabove, it will be appreciated that various modifications of the exemplary embodiment of the present invention can be made by those skilled in the art within a limit without departing from the scope of the present invention. Therefore, the scope of the present invention should not be determined to be limited to the exemplary embodiment and should be defined by appended claims to be described below and all changed or modified forms derived from equivalent concepts to the appended claims.

What is claimed is:

1. A method for displaying a charge energy by a solar roof system of a vehicle, comprising:
   determining, by a controller, whether the vehicle is in a parking mode or a driving mode based on whether a key of the vehicle is turned on or off when the solar roof system charging an auxiliary battery and a main battery installed in the vehicle operates;
   calculating, by the controller, a corresponding consumed energy and a corresponding gain fuel amount by determining whether the solar roof system charges the auxiliary battery or the main battery; and
   displaying, by the controller, at least one of the consumed energy or the gain fuel amount in the cluster of the vehicle and performing booting when the key is turned on in the parking mode and displaying at least one of the consumed energy or the gain fuel amount in the cluster when the key is turned off in the driving mode;
   wherein the consumed energy is calculated based on efficiency of a charge amount of the auxiliary battery or the main battery;
   wherein the gain fuel amount is proportional to a value obtained by subtracting controller consumed energy from auxiliary battery consumed energy and main battery consumed energy, and
   wherein the gain fuel amount is inversely proportional to high voltage battery discharge efficiency, LCD efficiency, auxillary battery charging efficiency, and energy density.

2. The method of claim 1, wherein the gain fuel amount is calculated as $$\text{fuel}_{solar} = \left( \frac{\epsilon_1 - \epsilon_{Controller}}{\eta_{MainDch} \cdot \eta_{LDC} \cdot \eta_{AuxChg}} + \epsilon_2 \right) \cdot \frac{1}{D_e}$$

and the consumed energy is calculated as $\epsilon_1 = \epsilon_{solar} \cdot \eta_{LSDC} \cdot \eta_{AuxChg}$ in the auxiliary battery, and the consumed energy is calculated as $\epsilon_2 = \epsilon_{solar} \cdot \eta_{HSDC} \cdot \eta_{MainChg}$ in the main battery,
   wherein $\text{fuel}_{solar}$: gain fuel amount (1), $D_e$: energy density (kJ/l), $\epsilon_{controller}$: consumed energy (kJ) of controller, $\epsilon_{solar}$: charged energy (kJ), and η: efficiency (LSDC, HSDC: SDC high low efficiency, AuxChg: auxiliary battery charging efficiency, MainChg: high-voltage battery charging efficiency, MainDch: high-voltage battery discharging efficiency, and LDC: LDC efficiency).

3. The method of claim 1, wherein when the auxiliary battery is charged by a low DC-DC converter (LDC), the auxiliary battery is charged with an energy by the solar roof system using a low solar DC-DC converter.

4. The method of claim 1, wherein when the main battery is charged by the low DC-DC converter (LDC), the main battery is charged with the energy by the solar roof system using a high solar DC-DC converter (SDC).

5. The method of claim 4, wherein the auxiliary battery is recharged with the energy charged through the high solar DC-DC converter (SDC) using the low DC-DC converter (LDC).

6. The method of claim 5, wherein the charge energy by the solar roof system is displayed in the cluster or an audio video navigation (AVN), and at least any one of a solar charging amount, fuel efficiency, a gain charge energy, or a gain fuel amount according to the parking mode and the driving mode is displayed.

7. A system for displaying a charge energy by a solar roof system of a vehicle, comprising:
  a memory configured to store program instructions; and
  a processor configured to execute the program instructions, the program instructions when executed configured to:
    determine whether the vehicle is in a parking mode or a driving mode based on whether a key of the vehicle is turned on or off when the solar roof system charging an auxiliary battery and a main battery installed in the vehicle operate;
    calculate a corresponding consumed energy and a corresponding gain fuel amount by determining whether the solar roof system charges the auxiliary battery or the main battery; and
    display at least one of the consumed energy or the gain fuel amount in the cluster of the vehicle and performing booting when the key is turned on in the parking mode and displaying at least one of the consumed energy or the gain fuel amount in the cluster when the key is turned off in the driving mode;
  wherein the consumed energy is calculated based on efficiency of a charge amount of the auxiliary battery or the main battery;
  wherein the gain fuel amount is proportional to a value obtained by subtracting controller consumed energy from auxiliary battery consumed energy and main batter consumed energy, and
  wherein the gain fuel amount is inversely proportional to high voltage battery discharge efficiency, LDC efficiency, auxiliary battery charging efficiency, and energy density.

8. The system of claim 7, wherein the gain fuel amount is calculated as $$\text{fuel}_{solar} = \left( \frac{\epsilon_1 - \epsilon_{Controller}}{\eta_{MainDch} \cdot \eta_{LDC} \cdot \eta_{AuxChg}} + \epsilon_2 \right) \cdot \frac{1}{D_e}$$

and the consumed energy is calculated as $$\epsilon_1 = \epsilon_{solar} \cdot \eta_{LSDC} \cdot \eta_{AuxChg} \text{ in the auxiliary battery,}$$

and the consumed energy is calculated as $\epsilon_2 = \epsilon_{solar} * \eta_{HSDC} * \eta_{MainChg}$ in the main battery,
  wherein $\text{fuel}_{solar}$: gain fuel amount (l), $D_e$: energy density (kJ/l), $\epsilon_{controller}$: consumed energy (kJ) of controller, $\epsilon_{solar}$: charged energy (kJ), and $\eta$: efficiency (LSDC, HSDC: SDC high low efficiency, AuxChg: auxiliary battery charging efficiency, MainChg: high-voltage battery charging efficiency, MainDch: high-voltage battery discharging efficiency, and LDC: LDC efficiency).

9. The system of claim 7, wherein when the auxiliary battery is charged by a low DC-DC converter (LDC), the auxiliary battery is charged with an energy by the solar roof system using a low solar DC-DC converter.

10. The system of claim 7, wherein when the main battery is charged by the low DC-DC converter (LDC), the main battery is charged with the energy by the solar roof system using a high solar DC-DC converter (SDC).

11. The system of claim 10, wherein the auxiliary battery is recharged with the energy charged through the high solar DC-DC converter (SDC) using the low DC-DC converter (LDC).

12. The system of claim 11, wherein the charge energy by the solar roof system is displayed in the cluster or an audio video navigation (AVN), and at least any one of a solar charging amount, fuel efficiency, a gain charge energy, or a gain fuel amount according to the parking mode and the driving mode is displayed.

\* \* \* \* \*